April 17, 1956 N. HARTLEY 2,742,201
VARIABLE BATCH MEASURING SYSTEM
Filed May 25, 1953 2 Sheets-Sheet 2
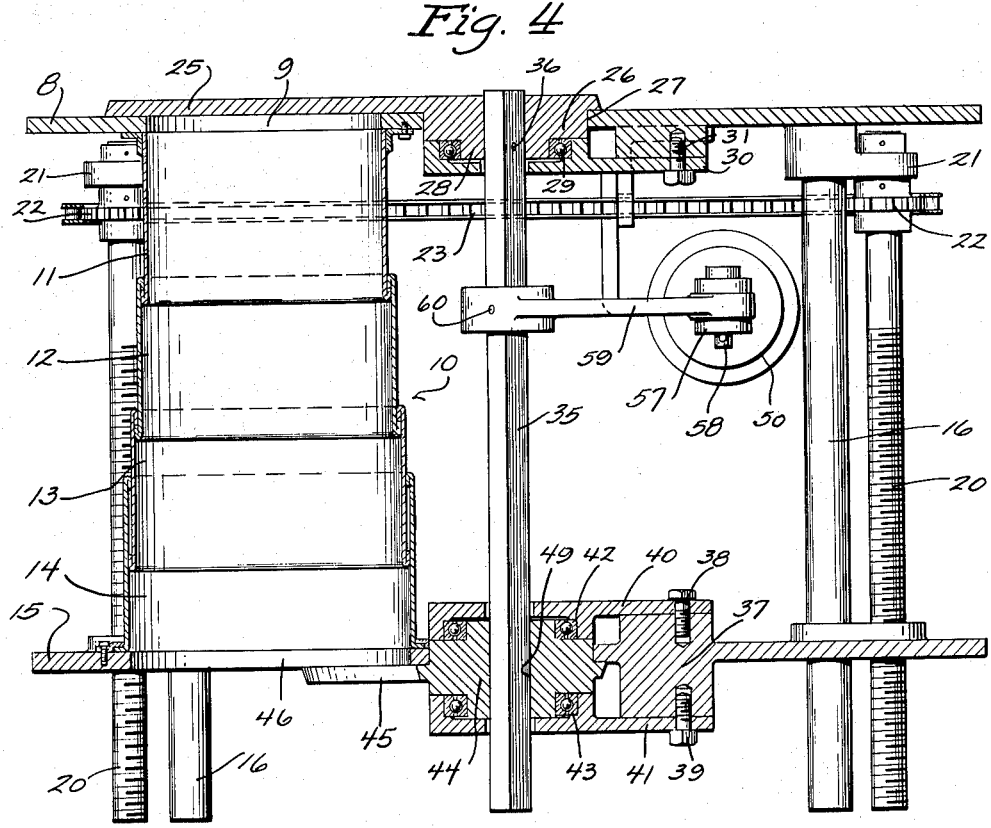
Fig. 4
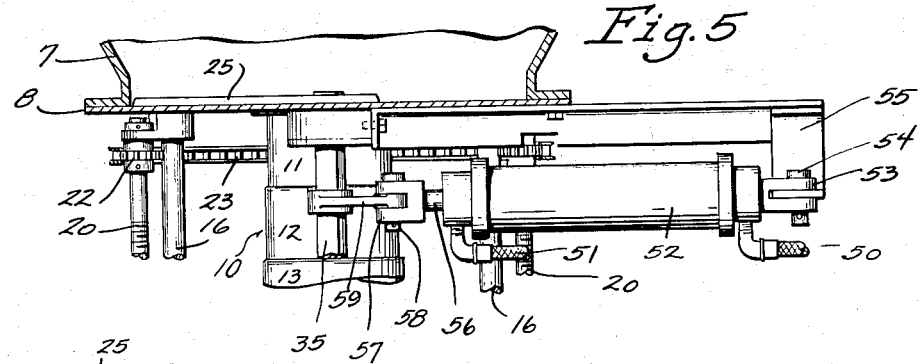
Fig. 5
Fig. 6
INVENTOR.
NELSON HARTLEY
BY
Wheeler, Wheeler & Wheeler
ATTORNEYS

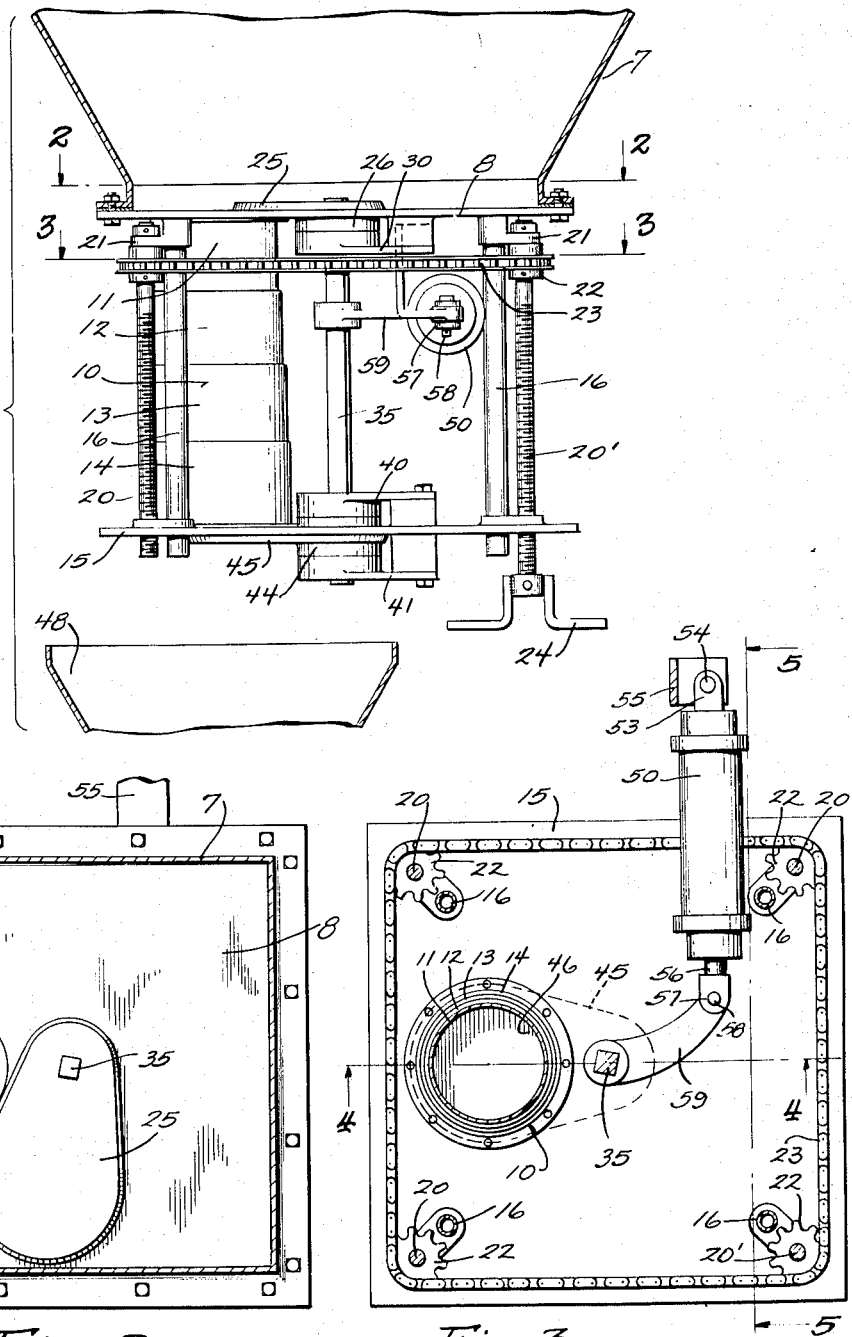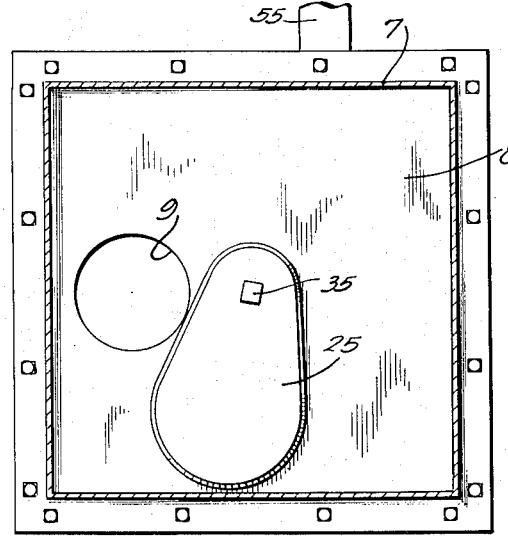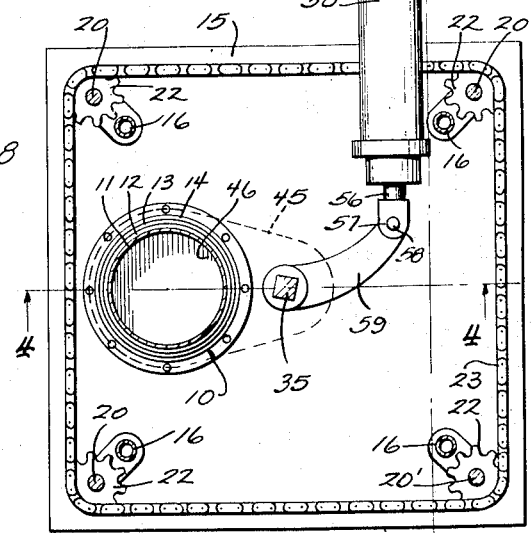

United States Patent Office 2,742,201
Patented Apr. 17, 1956

2,742,201

VARIABLE BATCH MEASURING SYSTEM

Nelson Hartley, Neenah, Wis., assignor to Haylco Controls Corporation, Neenah, Wis., a corporation of Wisconsin Application May 25, 1953, Serial No. 357,105

5 Claims. (Cl. 222—440)

This invention relates to a variable capacity batch measuring system.

While the device herein disclosed is usable for a variety of purposes, an example of its utility is to measure foundry sand additive into a batch upon the sand prepared in accordance with the disclosure of my co-pending application Serial No. 279,369, filed March 29, 1952 and entitled "Device for Supplying to a Foundry Sand Mixer Water and Sand in Automatically Predetermined Proportions According to Sand Temperatures," now Patent No. 2,709,843 of June 7, 1955.

The invention contemplates the use of a batch measuring chamber having telescopically adjustable walls to vary its capacity and having inlet and outlet valves alternately opening and closing for the admission and discharge of material to be measured, the bottom and top of the chamber being mounted for relative movement to effect the telescopic adjustment of the walls, and the respective valves having operating connections for accommodating such movements while assuring their alternate opening and closing as above described.

In the drawings:

Fig. 1 is a view in vertical section through supply and receiving hoppers and showing in side elevation the variable capacity receptacle and operating connections therefor.

Fig. 2 is a view in cross section taken on line 2—2 of Fig. 1.

Fig. 3 is a view in cross section on line 3—3 of Fig. 1.

Fig. 4 is a view on an enlarged scale taken in vertical section on the line 4—4 of Fig. 3.

Fig. 5 is a fragmentary detail view taken on the line 5—5 of Fig. 3.

Fig. 6 is a view on a reduced scale diagrammatically illustrating the valve ring in conjunction with a variable capacity measuring chamber.

The material to be measured is stored in a convenient receptacle such as the hopper 7, of which the bottom wall 8 has a port 9 opening into the top of the measuring chamber generically designated by reference character 10.

The measuring chamber comprises a series of telescopically related sections 11, 12, 13 and 14, as best shown in Fig. 4, the smallest of these sections being desirably at the top and being fixed to the hopper bottom wall 8. Thus, to the extent that there is any variation in diameter of chamber 10 between the top and bottom thereof the diameter is progressively expanded in a direction to preclude the possibility that material may lodge therein.

The lowest telescopic section 14 in the chamber 10 is mounted upon and connected with the plate 15 to partake of its vertical movement while the uppermost section 11 is connected with the bottom plate 8 of hopper 7. In the embodiment illustrated, a series of bars 16 depending from plate 8 passes through bearings in plate 15 to guide plate 15 in reciprocation to and from plate 8.

The desired reciprocative adjustment of plate 15 is effected by means of screws 20, four in number, which are swiveled in brackets 21, connected with plate 8, and are threaded through plate 15, and carry sprockets 22 about which chain 23 is trained so that screws 20 may be operated in unison. The means for their conjoint operation is not important to the present invention and is here represented by extension of one of the screws 20' to receive the handle 24 as shown in Fig. 1. When the handle 24 is rotated in one direction, plate 15 will be advanced toward plate 8. Rotation in the opposite direction will withdraw plate 15 from plate 8. These movements will increase or decrease the lap of the telescopic sections 11, 12, 13 and 14 and increase or decrease the capacity of chamber 10 accordingly.

An upper flow-controlling valve 25 is seated upon the top surface of the plate 8 as clearly shown in Figs. 1, 2 and 4. It is movable between the position shown in Fig. 2 and the position shown in Fig. 4 to open and close the port 9. The valve 25 has a boss 26 guided for oscillation in the bearing opening 27 of plate 8 (Fig. 4) and has an outwardly extended hub portion 28 supported by bearing 29 from plate 30 fastened by screw 31 beneath plate 8.

The squared operating shaft 35 is connected by cross pin 36 with hub 28 whereby the shaft is supported and guided for oscillation with the valve.

Boss means 37 integral with plate 15 (Fig. 4) receive screws 38, 39, whereby upper and lower mounting plates 40 and 41 are confined in engagement with bearings 42, 43, within which the hub portion 44 of lower valve 45 is mounted for oscillation. The lower valve controls the port 46 in plate 15 through which, when the valve 45 is in the open position shown in Fig. 4, material is discharged from the measuring chamber 10 into the spout 48. A squared opening 49 passes through the hub 44 of valve 45 to receive shaft 35 along which the hub of the valve is slidable, but with which the valve is constrained to rotate. Thus the valve 45 maintains its operative relation to plate 15, moving upwardly and downwardly as the plate is moved so that, in all positions of the plate 15, valve 45 will operatively control the discharge port 46 therethrough, oscillating between the open position of Fig. 4 and the closed position of Fig. 3 according to the position of oscillation of shaft 35.

In practice, I have found it expedient to locate the valves 25 and 45 at 80° angular offset from each other as diagrammatically shown in Fig. 6, but this specific angular relationship is determined by the relative dimensions of the valves and the ports controlled thereby and is not a feature of the invention.

Any appropriate means may be employed to oscillate the valves, the preferred arrangement being one in which the valve 25 is invariably closed when the valve 45 is open, and vice versa. In practice, the valve movement is effected pneumatically by the controlled admission and exhaust of air through the flexible air hose 50 and 51 which lead to opposite ends of cylinders 52. At one end, the cylinder is provided with a clevis 53 pivoted by pintle 54 to the mounting bracket 55. From the other end of the cylinder issues the plunger 56, which is provided with a clevis 57 connected by pintle 58 to an arm 59 secured by pin 60 to the square valve actuating shaft 35 as shown in Fig. 4.

In use, each time the valves 25 and 45 are in the positions shown in Figs. 1, 2 and 3, the port 46 at the bottom of the adjustable-capacity measuring chamber 10 will be closed and the chamber will be filled by gravity through open port 9 from hopper 7. According to the vertical adjustment of plate 15 with respect to plate 8, the capacity of the chamber will be greater or smaller.

When the air is admitted through hose 50 into cylinder 52 to oscillate the square shaft 35 clockwise as viewed in Fig. 3, the valves will be shifted abruptly to the position shown in Fig. 4, the top port 9 being closed and the bottom port 46 opened to discharge from chamber 10 the quantity of material to which its capacity has been adjusted. After the contents of the chamber have been discharged, the air may be exhausted from cylinder 52 through pipe 50 and air will be admitted thereto through pipe 51, thereby retracting plunger 56 to the position shown in Figs. 3 and 5 for abruptly closing valve 45 across port 46 at the bottom of chamber 10 and opening valve 25 to expose port 9 so that a fresh charge measured by the capacity of chamber 10 will flow into the chamber from hopper 7.

The device is particularly useful in measuring batches of dry granular or pulverized materials.

I claim:

1. In a device of the character described, the combination with a measuring chamber of adjustable capacity comprising top and bottom walls having inlet and outlet ports and a plurality of telescopically slidable sleeves of relatively smaller and larger cross section respectively connected with the top and bottom walls and encircling said ports, valves pivotally mounted upon the respective walls and oscillatable to and from port-closing position, a rock shaft coaxial with the pivot upon which the said valves are oscillatable, said shaft having operating connection with both of said valves and comprising axially slidable bearing means for driving one of said valves notwithstanding the changes in relative position of said top and bottom walls, vertically extending guide rod means for guiding said top and bottom walls for relative movement to and from each other, means for maintaining said top and bottom walls in adjusted position of such movement, and means for oscillating said rock shaft to actuate said valves, said valves being angularly offset with respect to each other whereby one closes as the other opens.

2. In a device of the character described, the combination with a measuring chamber of adjustable capacity and comprising telescopic sections, means for axially moving said sections to adjust the capacity of said chamber, oscillatory inlet and outlet valves for said chamber, said valves having a common axis of oscillation about which the valves are angularly offset, shaft means disposed on said axis and connecting said valves, means for rotating said shaft means on its axis to actuate said valves, said shaft means having a slip connection to one of said valves, said one valve having means connecting it to the means for axially moving said telescopic sections whereby said one valve is free to move with said telescopic sections and retains its operative connection to said shaft means notwithstanding such movement, said chamber further comprising top and bottom plates to which terminal telescopic sections are connected, said valves being provided with hubs journaled in said plates, the valve hubs being provided with aligned openings to which said shaft means is keyed.

3. In a device of the character described, the combination with a measuring chamber of adjustable capacity and comprising telescopic sections, means for axially moving said sections to adjust the capacity of said chamber, oscillatory inlet and outlet valves for said chamber, said valves having a common axis of oscillation about which the valves are angularly offset, shaft means disposed on said axis and connecting said valves, means for rotating said shaft means on its axis to actuate said valves, said shaft means having a slip connection to one of said valves, said one valve having means connecting it to the means for axially moving said telescopic sections whereby said one valve is free to move with said telescopic sections and retains its operative connection to said shaft means notwithstanding such movement, said chamber further comprising top and bottom plates to which terminal telescopic sections are connected, the means for axially moving said sections comprising a screw extending between said plates and a nut connecting said screw to one of said plates whereby rotation of said screw will advance said nut thereon together with said one plate.

4. The device of claim 3 in further combination with additional like screws and nut connections to said one plate, said screws being provided with means connecting them for concurrent rotation.

5. The device of claim 4 in which the means last mentioned comprises sprockets on said screws and an endless chain trained over said sprockets.

References Cited in the file of this patent

UNITED STATES PATENTS

| 304,214 | McCarthy | Aug. 26, 1884 |
| 547,848 | Davis | Oct. 15, 1895 |
| 1,036,807 | Dickey | Aug. 27, 1912 |
| 1,105,732 | West et al. | Aug. 4, 1914 |
| 1,149,442 | Hewson | Aug. 10, 1915 |
| 1,815,468 | Favro | July 21, 1931 |